United States Patent Office 3,508,943
Patented Apr. 28, 1970

3,508,943
PREPARATION OF SYNTHETIC NACREOUS
PIGMENT PASTES
Takaji Watanabe, Omiya-shi, Hisao Suzuki, Tokyo, Hiroshi Okawa, Suita-shi, and Kanji Nagasawa, Kyoto, Japan, assignors to Koppers Company, Inc., a corporation of Delaware
No Drawing. Filed June 29, 1967, Ser. No. 649,841
Claims priority, application Japan, July 11, 1966,
41/45,526
Int. Cl. C09c 1/14
U.S. Cl. 106—291         6 Claims

ABSTRACT OF THE DISCLOSURE

Synthetic nacreous pigment crystals prepared in a strongly acidic aqueous medium, such as crystals of lead hydrogen arsenate, are flushed, or directly transferred, into a conventional organic dispersing medium, such as a hydrocarbon, ester or ketone, using an organo polyoxyethylene phosphate, such as:

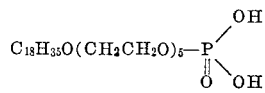

Flushing is accomplished without agglomeration or breakage of the crystals and residual water is easily expelled from the organic dispersing medium. The crystal paste thus obtained, after further dilution with organic dispersing medium, can be incorporated into thermoplastic, such as polystyrene or polyvinyl chloride, to provide cast sheets having a lustrous pearlescent sheen.

---

Synthetic nacreous pigment or synthetic pearlescence is used commercially to impart a pearl-like luster or sheen to plastic, paper and other substances. Individual crystals of synthetic nacreous pigment are substantially uniform, smooth platelets characterized by a comparatively large surface or plate area in contrast with an extremely small thickness. Generally, they are inorganic salts of lead or bismuth characterized by high refractive index, high reflectivity, transparency, and insolubility in organic media. The most commonly used synthetic nacreous pigments are basic lead carbonate, lead hydrogen arsenate, lead hydrogen phosphate and bismuth oxychloride.

The thin plate-like crystals are prepared by chemical reaction in an aqueous medium. Before they can be used effectively in casting or coating applications, the crystals must be dispersed in an organic medium which serves as a vehicle or carrier during coating or casting. Since the crystals have an average thickness of only 0.05–0.5 micron, and have a smooth plate-like character, it is difficult to recover them from the aqueous mother liquor without agglomeration or breakage. Both crystal agglomeration and breakage tend to destroy the brilliant pearl-like luster of the nacreous pigment, because agglomerates or fragments do not properly reflect light. Because of these problems, the crystals are ordinarily dispersed into an organic medium by a direct transfer process called "flushing." An extensive discussion of the flushing process appears in an article by Sei Hachisu entitled "Dispersion of Crystalline Basic Lead Carbonate Flushed With Nitrocellulose or Aerosol OT in Several Organic Solvents," Science of Light 8, No. 1 (1959). The primary requirements of a flushed nacreous pigment paste are good dispersibility in substantially all types of organic vehicles and good flow characteristics. For end use applications it is essential that the crystalline paste is capable of being dispersed in the organic carrier vehicle in the form of individual crystals.

In his article Professor Hachisu describes two flushing processes; one using a butyl acetate solution of nitrocellulose, and the other using a solution of sodium dioctylsuccinate in dichloromethane. It is apparent from Table I of the article that the pastes prepared by the flushing processes described by Dr. Hachisu are not easily dispersible in all of the conventional solvents used as the vehicle for synthetic pearlescence.

Other known flushing processes involve the use of metal salts of alkylaryl sulfonates, such as calcium alkylaryl sulfonates, dissolved in organic solvents. Such organic salts are comparatively ineffective when used for the flushing of synthetic nacreous pigment prepared in a strongly acidic aqueous medium; i.e., a dispersion having a pH below about 4. Of the nacreous pigments in common use, lead hydrogen arsenate and lead hydrogen phosphate are prepared in such acidic media.

The effectiveness of a flushing process depends upon the quality of the flushed paste with respect to dispersibility and flowability and also upon the efficiency with which water entrained by the crystals can be expelled from the flushed paste. Known methods of expelling the residual water involve heating under vacuum, two phase solvent extraction, and single phase solvent substitution. Care must be taken during the removal of water to avoid agglomeration of the crystals or crystal breakage.

We have discovered a unique method for providing flushed nacreous pigment pastes having excellent properties by using an organo polyoxyethylene phosphate characterized by excellent dispersing and water-expelling power.

In accordance with the invention, synthetic nacreous pigment crystals prepared in a strongly acidic medium, such as crystals of lead hydrogen arsenate or lead hydrogen phosphate, are flushed or directly transferred into a conventional organic dispersing medium by admixing an aqueous dispersion of nacreous pigment crystals; 10–60 percent by weight, based on the weight of said crystals, of an organic dispersing medium and from 0.5–5 percent by weight of an organo polyoxyethylene phosphate of the formula:

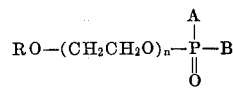

wherein R is a member selected from the group consisting of alkyl radicals having from 4–18 carbon atoms, alkenyl radicals having from 4–18 carbon atoms, and alkylphenyl radicals in which the alkyl portion has from 4–18 carbon atoms, $n$ is an integer having an average value of 3–15, and A and B are selected from the group consisting of —OH and —(OCH$_2$CH$_2$)$_n$—OR, wherein R and $n$ have the values given aforesaid. The mixture is stirred to effect transfer of the crystals to the organic medium and the residual water entrained with the crystals is expelled, preferably by mechanical separation.

As we have noted, the flushing process of the invention is particularly applicable to synthetic nacreous pigments normally prepared in strongly acidic aqueous media; i.e., as crystal dispersions having a pH of below 4. Typical nacreous pigment crystals prepared in such media are lead hydrogen arsenate and lead hydrogen phosphate crystals. The crystal concentration in the aqueous media to be flushed generally ranges between 25 and 75 percent by weight.

The flushing agent of the invention is an organo polyoxyethylene phosphate of the formula:

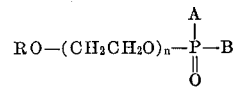

wherein R is a member selected from the group consisting of alkyl radicals having from 4–18 carbon atoms, alkenyl radicals having from 4–18 carbon atoms, and alkylphenyl radicals in which the alkyl portion has from 4–18 carbon atoms, $n$ is an integer having an average value of 3–15, and A and B are selected from the group consisting of —OH and —(OCH$_2$CH$_2$)$_n$—OR, wherein R and $n$ have the values given aforesaid. As seen from the above formula, the phosphate may contain one, two, or three organo polyoxyethylene groups attached to the phosphorus atom. The examples that follow show that particularly effective results are obtained when the organo group is an octyl, dodecyl, stearyl, or nonylphenyl radical. The number of polyoxyethylene groups present, represented by the value of $n$, is an average value because of the normally Gaussian distribution of such groups obtained during oxyethylation reactions.

The amount of organo polyoxyethylene phosphate present during the flushing process should be controlled within the range of 0.5–5 percent by weight, based upon the weight of the crystals. If more than 5 percent by weight phosphate is used, the heat stability of the pigment is lowered in casting applications and there is a deleterious effect on film hardness in coating applications. If less than 0.5 percent is used, there is insufficient phosphate to effect efficient transfer of the crystals to the organic medium and to expel the residual water therefrom. The preferred amount of phosphate ranges between one and two percent by weight, based upon the weight of the crystals.

During flushing, the phosphate coats the surface of the nacreous pigment crystals to give them a lyophilic character so that they are readily attracted to the organic dispersing medium. The lyophilic nature of the coated crystals makes it easy to expel water, even by mechanical means.

With the aid of the organo polyoxyethylene phosphate, the nacreous pigment crystals are directly transferred to a suitable organic dispersing medium. Any of the conventional organic media used in synthetic pearlescence are suitable for the process of the invention. Such media include hydrocarbons, i.e., hexane, xylene, benzene; esters, i.e., butyl acetate, ethyl acetate, linseed oil, dibutyl phthalate, dioctylphthalate, dioctyladipate, dioctylazerate, and dioctylsebacate; ketones, i.e., acetone, methylethyl ketone, and methylisobutyl ketone; alcohols, i.e., oleyl alcohol, butanol, meta-cresol, cyclohexanol, ethanol, and methanol; chlorinated hydrocarbons, i.e., carbon tetrachloride, monochlorobenzene, ortho-dichlorobenzene, dichloromethane, chloroform; and miscellaneous organic solvents i.e., ethyl ether, ether-ethanol mixtures, pyridine, nitromethane, nitrobenzene, ethylene glycol monoethyl ether, diacetone alcohol and furfural. Also useful are solutions of resins, such as alkyd resins and saturated or unsaturated polyester resins. The choice of the organic medium depends upon the intended end use of the synthetic nacreous pigment. For example, for casting applications involving the incorporation of the pigment in thermoplastic resins, such as polymethyl methacrylate, polyvinyl chloride, or polystyrene, it is preferable to use a plasticizing material, such as dibutylphthalate or dioctylphthalate. Excellent results are obtained for these applications using mixtures of low viscosity phthalic-based polyester resins and dibutylphthalate. For coating and lacquer applications the crystals can be directly transferred into butyl acetate solutions of nitrocellulose. In the preparation of paints an effective organic medium is a mixture of coconut oil-modified alkyd resin and toluene.

The amount of organic medium used in the flushing process varies between 10 and 60 percent by weight, based on the weight of the crystals. If less than 10 percent by weight of organic medium is used, it is difficult to effect crystal transfer without damage or agglomeration. The amount of organic medium should be kept to a minimum because of the economic problems involved in handling equipment and separation of the residual water.

After the admixture of the aqueous crystal dispersion, the organo polyoxyethylene phosphate flushing agent, and the organic medium, direct transfer is accomplished by a gentle agitation of the mixture.

The time required for flushing depends to some extent upon the size of the batch and the temperature at which the flushing operation is carried out. The time period generally ranges from between about five minutes to two hours.

Flushing can be carried out at room temperature or in a temperature range from about 20° C. up to the boiling point of the mixture. A preferred temperature range is 25–80° C. The choice of temperature varies with the selection of the particular organic dispersing medium used. An elevated temperature is sometimes helpful in assisting in the substitution of surface adsorbed materials with the flushing agent, making it easier to expel the water.

Because of the strong adsorbing power of the organo polyoxyethylene phosphate flushing agent to the surface of the nacreous pigment particles, the residual water entrained with the pigment can be removed by mechanical means, such as centrifugation. Mechanical separation is preferable because it provides for a simpler process. If desired, water can be expelled by the known techniques of heating under vacuum, two phase solvent extraction, or single phase solvent substitution.

Our invention is further illustrated by the following examples:

EXAMPLE I

A 2000 g. quantity of a thickened aqueous paste containing 50 percent by weight lead hydrogen arsenate platelet crystals was stirred with a mixture consisting of 180 g. of dioctylphthalate and 20 g. of an organo polyoxyethylene phthalate having the following formula:

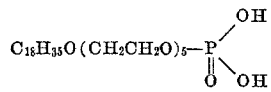

With gentle stirring at a temperature of 80° C., all of the crystals were transferred into the dioctylphthalate phase and the water phase became completely clear. After separating the free water, a centrifugal separation at 2000 G was used for expelling the residual entrained water. Without any substantial loss of dioctylphthalate, the residual water was completely removed. The dioctylphthalate paste of crystals was diluted with dioctylphthalate to adjust the crystal concentration to 70 percent by weight. The resulting dispersion was then ready for incorporation on thermoplastic resins, such as polyvinyl chloride, polystyrene and polymethyl methacrylate.

EXAMPLE II

The procedure of Example I was repeated with the exception that a paste of lead hydrogen phosphate was used in place of the lead hydrogen arsenate and the amount of flushing agent was 10 g. rather than 20 g. The flushing process was accomplished with substantially complete removal of residual water without breakage or agglomeration of the crystals.

EXAMPLE III

The procedure of Example I was substantially repeated using 20 g. of a mixture (10 g. each) of polyoxyethylene phosphates having the formulas:

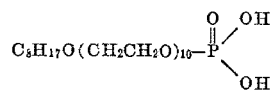

and

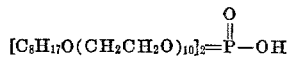

The mixed phosphates were dissolved in 180 g. of toluene and added to the aqueous paste of Example I. The mixture was stirred at room temperature for a few minutes.

Residual water was expelled by centrifugation. Thereafter a solution of 200 g. of nitrocellulose and 500 g. of butyl acetate was added to the paste and the mixture was blended to form a homogeneous dispersion of crystals. This dispersion was suitable for the preparation of nitrocellulose lacquers.

EXAMPLE IV

The procedure of Example I was substantially repeated with the following modifications:

A 100 g. quantity of a low viscosity phthalic polyester and 80 g. of dibutylphthalate was used as the organic dispersing medium and the crystals were flushed at 60° C. The resulting dispersion, after further dilution with organic dispersing media, produced an excellent finish having a beautiful pearly sheen in the casting of a polyester resin.

EXAMPLE V

The procedure of Example I was substantially repeated with the following modifications to obtain a high nacreous luster and good adhesive characteristics when applied in the form of a baked paint:

A mixture consisting of 10 g. of organo polyoxyethylene phosphate of the following formula:

$$[C_{12}H_{25}O(CH_2CH_2O)_5]_3 \equiv P = O$$

100 g. of coconut oil-modified alkyd resin and 80 g. of toluene was used as the organic dispersing medium and flushing was carried out at 20° C. Once again the residual water was completely expelled and a uniform homogeneous paste having good flow properties was provided.

EXAMPLE VI

The procedure of Example I was substantially repeated with the exception that the flushing was carried out with 30 g. of an organo polyoxyethylene phosphate having the formula:

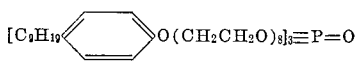

80 g. of butyl acetate and 100 g. of toluene. The resulting nacreous paste is useful for various paints made from bases of epoxy resin, alkyd resin, unsaturated polyester resin, and acrylic resin.

Many modifications of the foregoing examples can be made, depending upon the intended end use. The choice of phosphate flushing agent can be varied, depending upon the particular dispersing medium selected. The possible variation in oxyethylene groups of the flushing agent permits the modification of the pigment paste to suit particular organic dispersing media. Substantially uniform single crystal dispersion is provided by the long chain alkyl or alkenyl radical attached to the polyoxyethylene group.

EXAMPLE VII

An attempt was made to obtain the wide dispersing characteristics of the flushing paste of the invention by the known method using a calcium salt of an alkylbenzene sulfonate. A 167 g. quantity of aqueous paste containing 60 percent by weight crystals of lead hydrogen arsenate were treated according to a process similar to that described in Example I with a 10 percent solution of calcium laurylbenzene sulfonate in mineral turpentine oil. After stirring for about 10 minutes at room temperature, flushing was completed. The water phase was clear, but the flushed paste contained many granules having high residual water content. The water residue in the flushed paste represented between 27 and 37 percent by weight. The dispersibility of the paste in methylisobutyl ketone, dioctylphthalate, and dibutylphthalate was far below that of a comparable paste of the present invention.

As a comparative test, the identical procedure was followed using the organo polyoxyethylene phosphate of Example IV in place of the calcium laurylbenzene sulfonate. Flushing was completed within a five-minute period. The resulting paste exhibited good fluidity and perfect dispersibility in solvents and plasticizers. The residual water content was found to be less than 2 percent.

We claim:

1. In the preparation of nacreous pigment paste by the direct transfer of synthetic nacreous pigment crystals from a strongly acidic aqueous medium to an organic dispersing medium, the improvement comprising admixing an aqueous dispersion of nacreous pigment crystals, 10–60 percent by weight, based on the weight of said crystals, of an organic dispersing medium, and from 0.5–5 percent by weight, based on the weight of said crystals, of an organo polyoxyethylene phosphate of the formula:

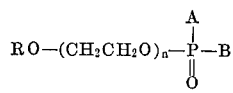

wherein R is a member selected from the group consisting of alkyl radicals having from 4–18 carbon atoms, alkenyl radicals having from 4–18 carbon atoms, and alkylphenyl radicals in which the alkyl portion has from 4–18 carbon atoms, n is an integer having an average value of 3–15, and A and B are selected from the group consisting of —OH and $$[RO(CH_2CH_2O)n] - (OCH_2CH_2)_n - OR$$

wherein R and n have the values given aforesaid; stirring the mixture to effect transfer of said crystals to said organic medium; and removing the water entrained with said crystals from said organic medium.

2. Method according to claim 1 wherein said synthetic nacreous pigment is lead hydrogen arsenate.

3. Method according to claim 1 wherein said synthetic nacreous pigment is lead hydrogen phosphate.

4. Method according to claim 1 wherein the amount of said organo polyoxyethylene phosphate is 1–2 percent by weight, based on the weight of said crystals.

5. Method according to claim 1 wherein the temperature of the mixture during stirring is 25–80° C.

6. Method according to claim 1 wherein the water entrained with said crystals is expelled by centrifugation.

References Cited

UNITED STATES PATENTS

| | | | |
|---|---|---|---|
| 2,882,283 | 2/1958 | Blaser et al. | 106—262 |
| 2,950,981 | 8/1960 | Miller et al. | 106—291 |
| 3,123,485 | 3/1964 | Miller et al. | 106—291 |

JAMES E. POER Primary Examiner

U.S. Cl. X.R.

106—308, 297